(12) United States Patent
Nicholson et al.

(10) Patent No.: US 7,370,852 B2
(45) Date of Patent: May 13, 2008

(54) BUSH ASSEMBLY

(75) Inventors: Ian Nicholson, Melksham (GB); Michael Paul Rooke, Chippenham (GB)

(73) Assignee: Avon Vibration Management Systems Limited, Wiltshire (GB)

( * ) Notice: Subject to any disclaimer, the term of this patent is extended or adjusted under 35 U.S.C. 154(b) by 195 days.

(21) Appl. No.: 11/107,023

(22) Filed: Apr. 15, 2005

(65) Prior Publication Data

US 2005/0242480 A1  Nov. 3, 2005

(30) Foreign Application Priority Data

Apr. 29, 2004  (GB) .................................. 0409595.6

(51) Int. Cl.
*F16F 5/00* (2006.01)
(52) U.S. Cl. .................................. 267/140.12; 267/293
(58) Field of Classification Search ........... 267/140.12, 267/293
See application file for complete search history.

(56) References Cited

U.S. PATENT DOCUMENTS 6,382,605 B1 * 5/2002 Kato ......................... 267/141.2
6,854,723 B2 * 2/2005 Ogawa et al. .............. 267/293
2003/0001323 A1   1/2003 Hettler

FOREIGN PATENT DOCUMENTS

DE        2507127     *  5/1976
GB        2370338 A       6/2002
JP        2003074633 A    3/2003

* cited by examiner

*Primary Examiner*—Bradley King
(74) *Attorney, Agent, or Firm*—McGarry Bair PC

(57) ABSTRACT

A bush assembly is seated in a housing, having an outer sleeve (10), an inner tube (12) and a resilient body (14) connecting the inner tube (12) and the outer sleeve (10). The outer sleeve (10) has projections (20) from its outer surface that abut the inner surface of the housing (40) and cause local deformations on the sleeve around the projections (20). The local deformations around the projections (20) cause the radial gap (16) between the inner tube (12) and the outer sleeve (10) to change circumferentially and thus bush has different radial stiffness in different directions.

18 Claims, 4 Drawing Sheets

BUSH ASSEMBLY

BACKGROUND OF THE INVENTION

1. Field of the Invention

The present invention relates to a bush assembly, to a method of manufacturing such a bush assembly and to a bush for use in such an assembly. It is particularly, but not exclusively, concerned with a bush assembly for use in a sub frame of an automobile.

2. Summary of the Prior Art

One known bush for use in a automobile between the chambers and the sub frame has an outer sleeve and a tube in the sleeve, the sleeve and the tube being interconnected by a resilient body. The sleeve is then mounted in a housing such as a bracket. Then the bracket may be attached to, or embedded in, the sub frame and the tube attached to the chassis, or vice versa. Thus active movement of the sleeve and the tube, and hence the chassis and the relevant part of the sub frame, are resisted by the resilience of the resilient body.

In such a bush assembly, the stiffness of the assembly, and hence its effect on vibrations is determined by the resilient body. However, it is been found desirable to have different radial stiffnesses in different directions.

SUMMARY OF THE INVENTION

At its most general, the present invention proposes that at least one projection be provided on the sleeve, which projection(s) will abut the wall of the bore of the housing into which the sleeve is inserted, thereby locally deforming the sleeve.

Thus, at the location of the projection(s) the gap between the sleeve and the tube is reduced as compared with other radial positions. This locally compresses the resilient body, permitting the desired radial stiffness characteristics to be achieved.

In the present invention, the deformation of the sleeve due to the presence of the projection(s) is achieved when the sleeve is inserted in the housing, rather than being achieved by the initial shaping of the sleeve.

It would be more difficult to pre-mould the sleeve to that shape, or to provide an additional component between the sleeve and the tube to achieve the same effect.

Thus, a first aspect of the present invention may provide a bush assembly comprising:

a sleeve formed of a deformable nylon material and having an outer surface that has an outer diameter that is formed with at least one projection;

a tube within the sleeve, there being a gap between the sleeve and the tube;

a resilient body formed of a rubber material interconnecting the tube and the sleeve; and a housing having a bore with an inner diameter into which the sleeve is received, the at least one projection abutting the wall of the bore;

wherein the sleeve outer diameter is of a size to provide a good grip between the sleeve and the housing bore and further is adapted to locally deform radially inwardly adjacent the projection when the sleeve is mounted within the bore such that the radial width of the gap between the sleeve and the tube radially inward of the projection is less than at least one other circumferential point of the tube.

The sleeve needs to be of a material suitable to be deformed under the effect of the interaction of the projection and the wall of the bore of the housing.

Preferably, the sleeve is therefore of nylon or other plastics material which may provide sufficient rigidity to maintain the resilient body in place, but be sufficiently deformable for the effects of the present invention to be achieved.

To improve the deformability, the thickness of the sleeve in the radial direction may be reduced adjacent to the position of the projection, e.g. by providing a groove in the outer surface of the sleeve.

It should also be noted that, prior to insertion of the bush into the housing, the diameter of the sleeve will be slightly greater than the diameter of the bore, to provide an overall compressor effect which is desirable to eliminate and stresses in the resilient body, and also to provide good grip between the sleeve and the housing.

The projections then provide an additional reduction in diameter at their radial positions.

Preferably, two projections are provided at opposite ends of a diameter, and those projections may then be at a mid point of the sleeve, in the axial direction of the sleeve.

Moreover, whilst it would be usual for the projections to have the same height, it is not essential and they may be different to give different stiffness effects on opposite sides of the bush.

According to a second aspect of the present invention there may be provided a method of manufacturing a bush assembly, comprising inserting a bush into a bore in a housing, the bush comprising:

a sleeve formed of a deformable nylon material and having an outer surface that has an outer diameter that is formed with at least one projection;

a tube within the sleeve, there being a gap between the sleeve and the tube;

a resilient body formed of a rubber material interconnecting the tube and the sleeve; and a housing having a bore with an inner diameter into which the sleeve is received, the at least one projection abutting the wall of the bore;

wherein the sleeve outer diameter is of a size to provide a good grip between the sleeve and the housing bore and further is adapted to locally deform radially inwardly adjacent the projection such that the radial width of the gap between the sleeve and the tube radially inward of the projection is less than at least one other circumferential point of the tube.

According to a third aspect of the present invention there may be provided a bush comprising:

a sleeve formed of a deformable nylon material and having an outer surface that has an outer diameter and that is formed with at least one projection;

a tube within the sleeve, there being a gap between the sleeve and the tube;

a resilient body formed of a rubber material interconnecting the tube and the sleeve; wherein radial depression of at least one projection relative to the rest of the sleeve causes local deformation of the sleeve such that the radial width of the gap between the sleeve and the tube radially inward of the projection is less than at least one other circumferential point of the tube.

BRIEF DESCRIPTION OF THE DRAWINGS

An embodiment of the present invention will now be described in detail by way of example, with reference to the accompanying drawings in which:

FIGS. 1a and 1b are transverse and axial sectional views through a bush for use in an embodiment of the present invention, FIG. 1b being taken along the line B to B in FIG. 1a;

DETAILED DESCRIPTION

An embodiment of the present invention, being a sub frame bush assembly for use in an automobile, will now be described.

Figure 1A:
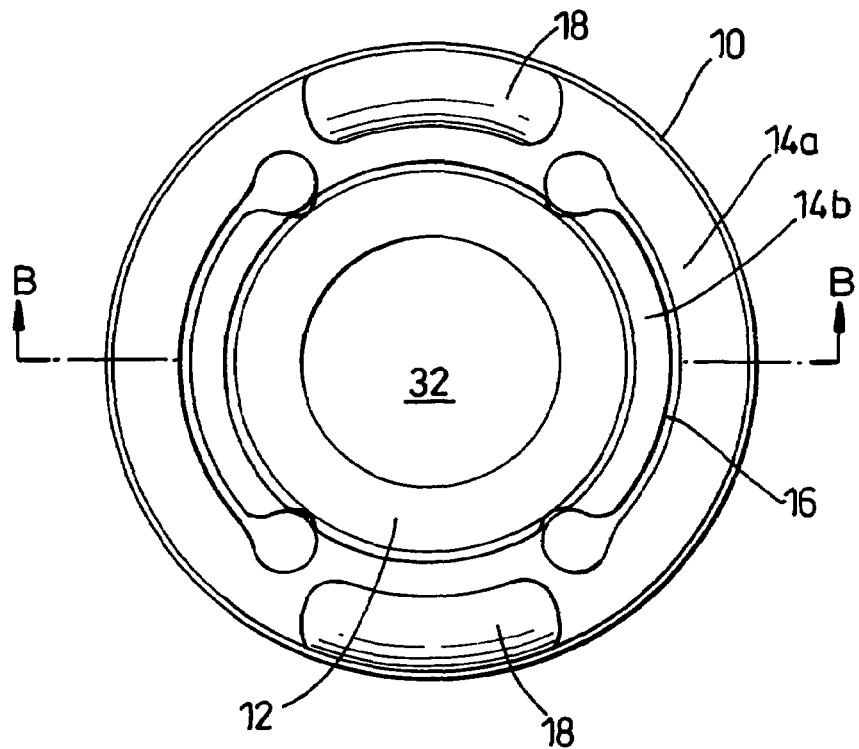
Figure 1B:
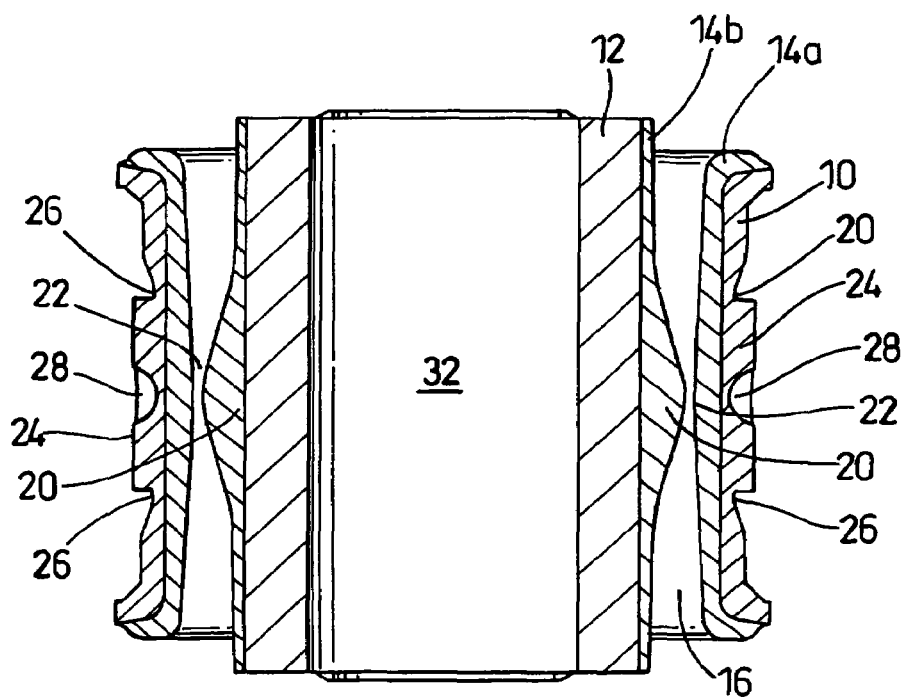

The assembly comprises a bush which is mounted in a housing, and FIGS. 1a and 1b show the bush prior to its mounting in the housing, the bush comprises an outer sleeve 10 and an inner tube 12 connected by a resilient body 14. In the axial sectional of view of FIG. 1b, the resilient body appears to have two parts 14a and 14b, and attached to the sleeve 10 and one attached to tube 12. However, as the transverse sectional view of FIG. 1a shows, space 16 does not extend for the whole circumference of the bush.

Instead, the part 14a and 14b are interconnected at circumferential positions perpendicular to sectional line of FIG. 1b, by interconnections known as struts 18. The struts 18 determine the radial stiffness of the bush in a direction perpendicular to the line B to B.

It can be seen that the inner part 14b of the resilient body has projections 20 thereon at a circumferential position on such that the radial width of the gap between the sleeve and the tube radially inward of the projection is less than at least one other circumferential point of the tube.

These projections locally reduce the radial width of the space 16 between the parts 14a and 14b of the resilient body, but there remains a gap 22 between the parts 14a and 14b prior to the mounting of the bush in a housing.

FIG. 1b also shows that the sleeve 10 has a projection 24 thereon, projecting radially outwards of the sleeve. The sleeve is locally thinned by grooves 26 at the periphery of the projection 24 and the projection has a recess 28 in it outer surface. As illustrated in FIG. 1b, the projection 24 and the sleeve 10 are made of the same material and are integrally formed.

Figure 2:
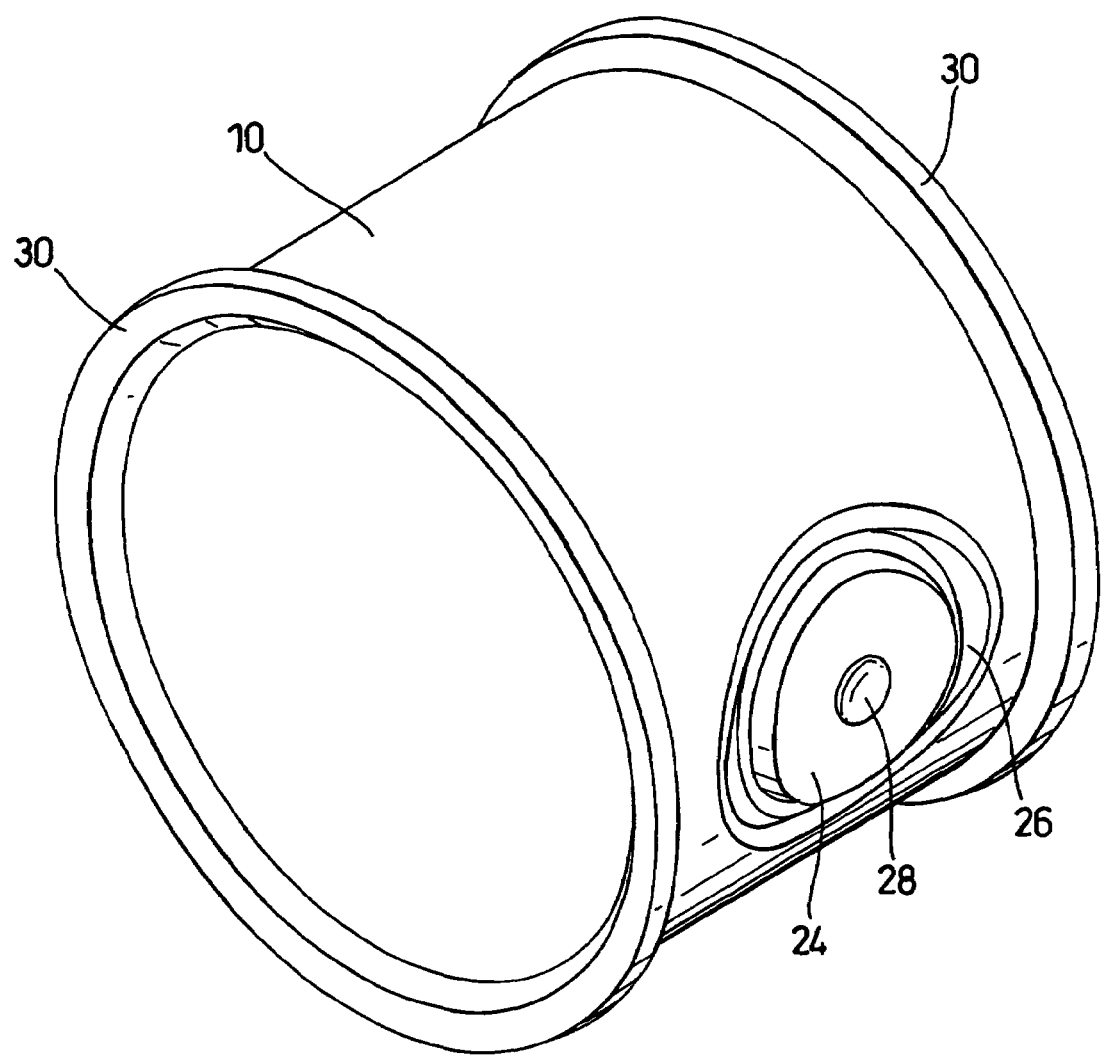
FIG. 2 is a perspective view of the sleeve of the bush of FIGS. 1a and 1b.
Figure 3:
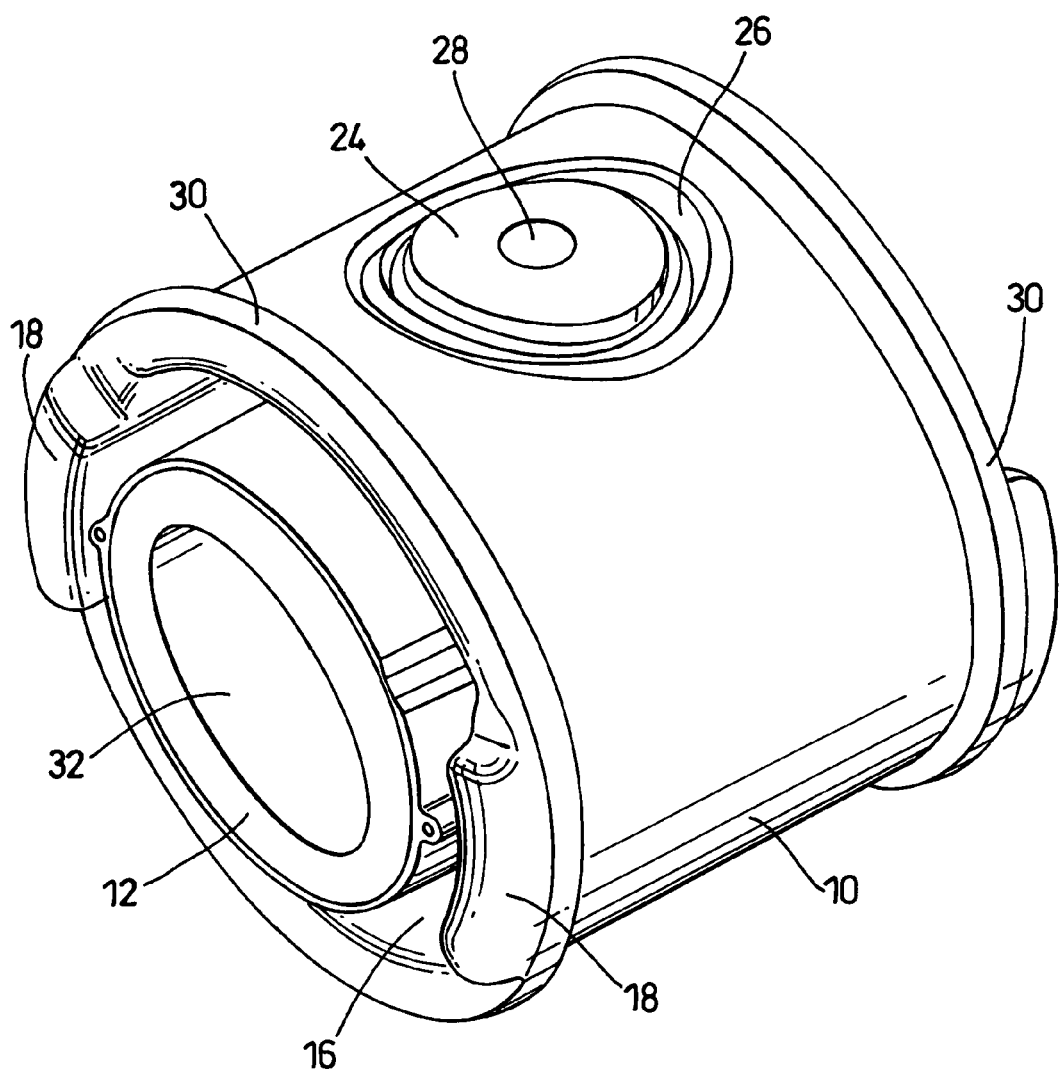
FIG. 3 is a perspective view of the bush shown in FIGS. 1a and 1b.

The sleeve 10 is shown in perspective view in FIG. 2 which illustrates that the sleeve 10 has a rim 30 at the axial ends thereof, FIG. 3 then shows a perspective view similar to that of FIG. 2, but showing the whole of the bush illustrated in FIGS. 1a and 1b. The struts 18 can be seen more clearly in that view.

It should also be noted that the inner tube 12 has an inner bore 32, which will receive a bolt to attach it to an automobile chassis (not shown).

Figure 4A:
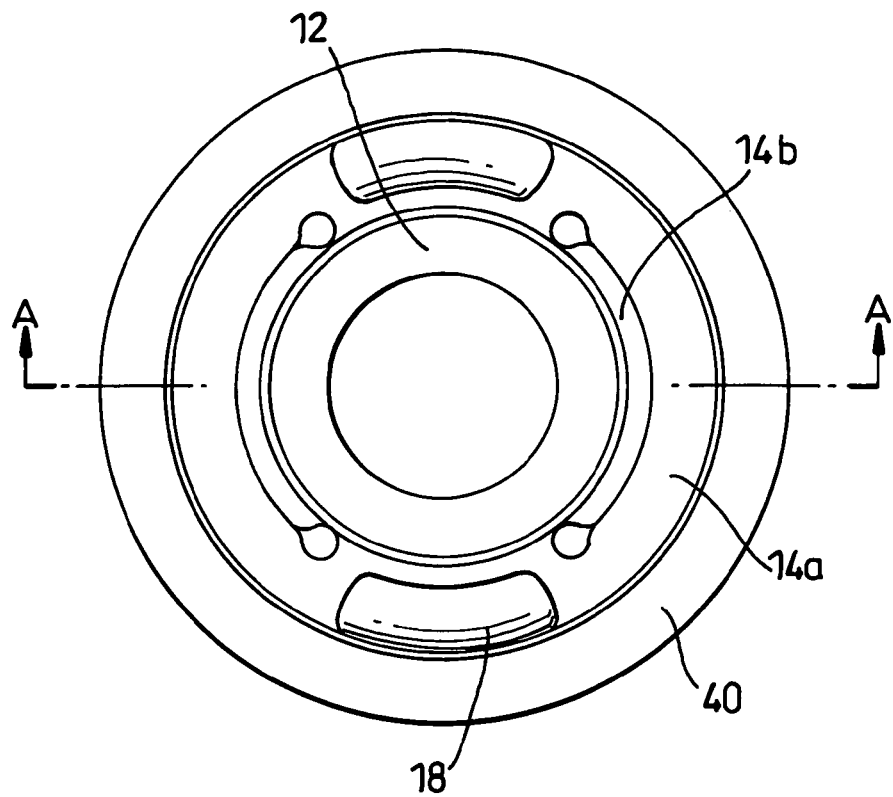
FIGS. 4a and 4b are transverse and axial sectional views through a bush assembly being an embodiment of the present invention, and incorporating the bush of FIGS. 1a and 1b.
Figure 4B:
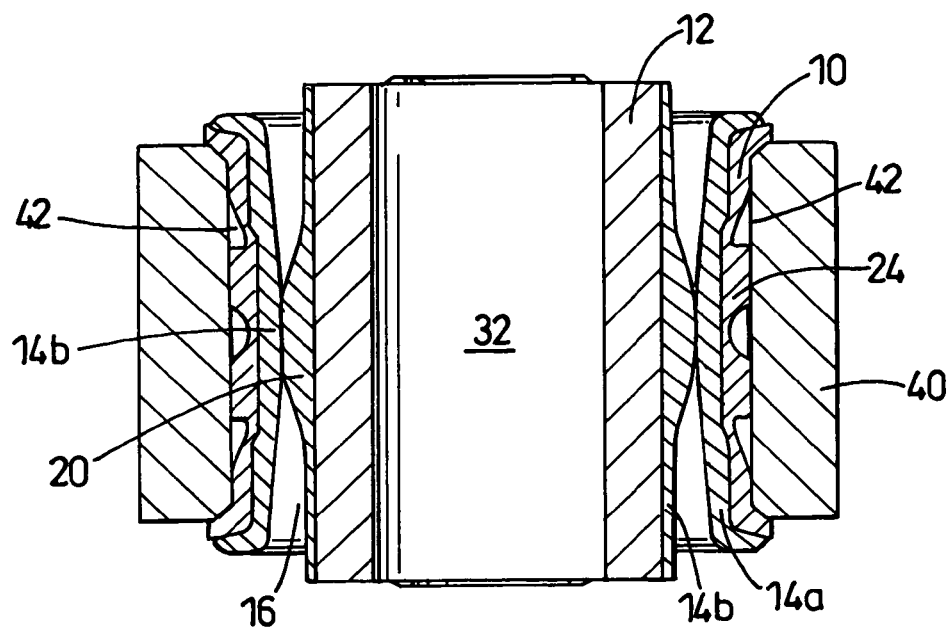

The bush of FIGS. 1 to 3 is then mounted in a bore of a housing embedded in an automobile sub-frame. The resulting structure is shown in FIGS. 4a and 4b, in which the housing is shown schematically by reference numeral 40.

Other features of the bush are the same as in FIGS. 1a and 1b and shown by the same reference numerals. Some reference numerals are omitted for the sake of clarity.

As is conventional, the bush, when manufactured has a slightly greater diameter than the diameter of the bore of the housing 40 in to which the bush is mounted. This causes overall compression of the bush by e.g. about 3%, and this compresses the resilient material of the body (comprising parts 14a and 14b) to eliminate post-moulding shrinkage stresses and also to cause the outer surface of the sleeve 10 to press against the inner wall 42 of the housing 40 so that the sleeve is gripped by the housing.

However, since the projections 24 project outwardly of the sleeve, they abut against the wall 42 of the bore of the housing 40, locally deforming the sleeve 10 inwardly.

This reduces the space 16 to bring the parts 14a to 14b of the resilient body into abutment along the line A to A. In that direction the radial stiffness of the bush is determined by the abutment of parts 14a and 14b of the resilient body.

Typically, the additional deformation of the sleeve 10 at the position of the projections 24 is of the order of 1% to 5%, preferably around 2.7%.

With such a bush, the radial stiffness in the direction perpendicular to the line A to A is of the order of 1650N/mm, as previously mentioned, and the radial stiffness in the direction along the line A to A is of the order of 500N/mm.

Thus, significantly different stiffnesses can be achieved in different radial directions, and the value of the radial stiffness in the direction A to A can be determined by the size and configuration of the projections 24.

Without the projections, it is generally found that the stiffnesses are too low.

The sleeve is preferably made of nylon, preferably glass filled nylon 6.6 the glass filled range of which is 0% to 30%.

The resilient material of the body 14 formed by parts 14a and 14b is normally of rubber.

The projections 24 may be circular or oval, and preferably are positioned at the axial mid point of the bush as illustrated in the embodiment discussed above. Although the embodiment discussed above shows the projections at opposite ends of a diameter, this is not essential and it could be at any circumferential positions on the sleeve.

There are preferably two projections, but more may be provided if more complicated stiffness characteristics were to be needed. It would also be possible to have projections of different heights at different circumferential positions.

What is claimed is:

1. A bush assembly comprising:
    a sleeve formed of a deformable nylon material and having an outer surface that has an outer diameter and that is formed with at least one radial projection;
    a tube within the sleeve, there being a gap between the sleeve and the tube;
    a resilient body formed of a rubber material interconnecting the tube and the sleeve; and
    a housing having a bore with an inner diameter and into which the sleeve is received, the at least one projection abutting the wall of the bore;
    wherein the sleeve outer diameter is of a size to provide a good grip between the sleeve and the housing bore and further is adapted to locally deform radially inwardly adjacent said at least one projection when the sleeve is mounted within the bore such that the radial width of said gap between the sleeve and the tube radially inward of said at least one projection is less than that at at least one other circumferential point of the tube.

2. A bush assembly according to claim 1 wherein said housing provides a radial compressive force on the sleeve.

3. A bush assembly according to claim 1 wherein said at least one projection comprises two projections at opposite ends of a diameter.

4. A bush assembly according to claim 3 wherein the two projections are situated adjacent to a mid point of the sleeve in the axial direction of the sleeve.

5. A bush assembly according to claim 3 wherein the two projections have different heights.

6. A bush assembly according to claim 1 wherein the thickness of the sleeve in the radial direction adjacent to the position of said at least one projection is thinner than parts of the sleeve remote from said at least one projection.

7. A method of manufacturing a bush assembly, comprising inserting a bush into a bore in a housing, the bush comprising:

a sleeve formed of a deformable nylon material and having an outer surface that has an outer diameter and that is formed with at least one radial projection;

a tube within the sleeve, there being a gap between the sleeve and the tube;

a resilient body formed of a rubber material interconnecting the tube and the sleeve; and a housing having a bore with an inner diameter and into which the sleeve is received, said at least one projection abutting the wall of the bore;

wherein the sleeve outer diameter is of a size to provide a good grip between the sleeve and the housing bore and further is adapted to locally deform radially inwardly adjacent said at least one projection such that the radial width of said gap between the sleeve and the tube radially inward of said at least one projection is less than said radial width at at least one other circumferential point of the tube.

8. A method of manufacturing a bush assembly according to claim 7 wherein the sleeve has a diameter greater than that of the bore prior to the insertion of the sleeve into the bore.

9. A bush assembly according to claim 1 wherein the sleeve and projection are integrally formed.

10. A bush comprising:

a sleeve formed of a deformable nylon material and having an outer surface that has an outer diameter and that is formed with at least one radial projection;

a tube within the sleeve, there being a gap between the sleeve and the tube;

a resilient body formed of a rubber material interconnecting the tube and the sleeve;

wherein radial depression of the at least one projection relative to the rest of the sleeve causes local deformation of the sleeve such that the radial width of the gap between the sleeve and the tube radially inward of said at least one projection is less than the radial width at least one other circumferential point of the tube.

11. A bush according to claim 10 wherein the sleeve provides sufficient rigidity to grip the resilient body.

12. A bush according to claim 10 wherein the at least one projection is two projections at opposite ends of a diameter.

13. A bush according to claim 12 wherein the two projections are situated at a mid point of the sleeve in the axial direction of the sleeve.

14. A bush according to claim 12 wherein the two projections have different heights.

15. A bush according to claim 10 wherein the thickness of the sleeve in the radial direction adjacent to the position of said at least one projection is thinner than parts of the sleeve remote from the position of said at least one projection.

16. A bush assembly according to claim 10 wherein the nylon is glass filled.

17. A bush assembly according to claim 10 wherein the sleeve and the projection are integrally formed of the same material.

18. A bush assembly according to claim 10 wherein the sleeve and the projection are integrally formed of the same material.

* * * * *